June 26, 1923.
E. A. SPERRY
1,459,902
SEARCHLIGHT FOR THE GUIDANCE OR DETECTION OF AIRCRAFT
Filed April 19, 1918    2 Sheets-Sheet 1
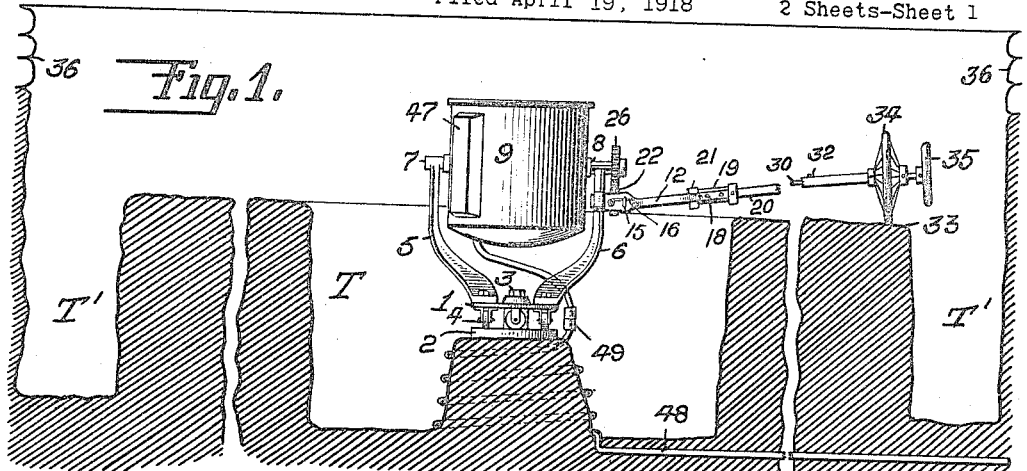
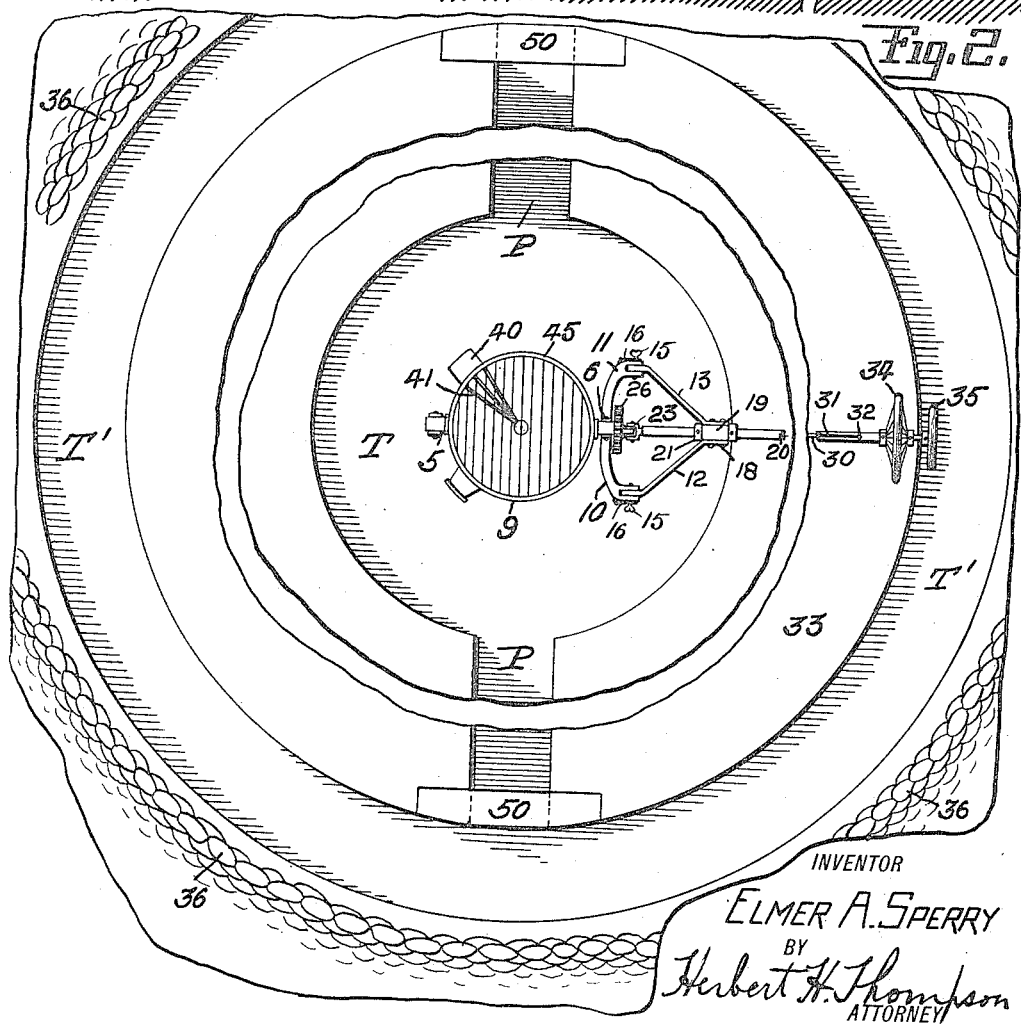
INVENTOR
*Elmer A. Sperry*
BY
*Herbert H. Thompson*
ATTORNEY June 26, 1923.
E. A. SPERRY
1,459,902
SEARCHLIGHT FOR THE GUIDANCE OR DETECTION OF AIRCRAFT
Filed April 19, 1918       2 Sheets-Sheet 2
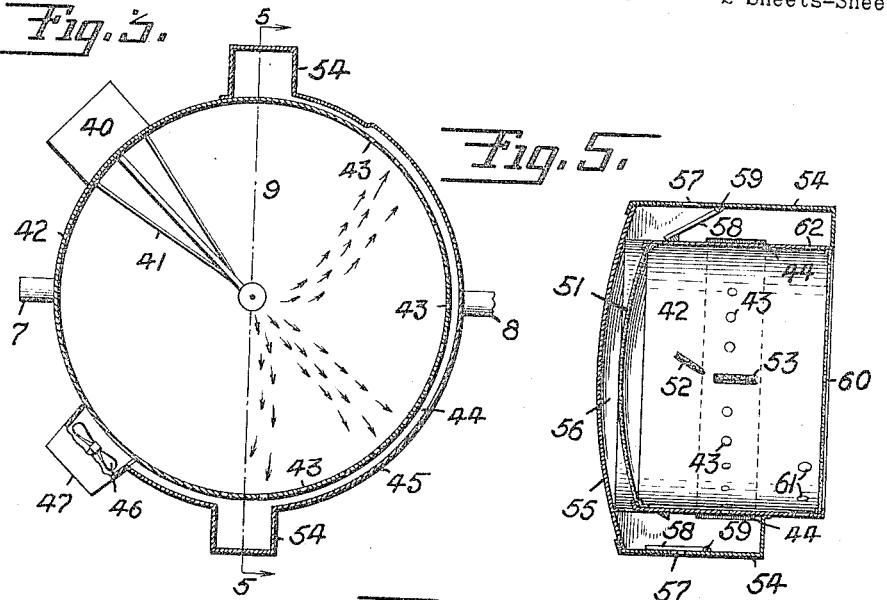
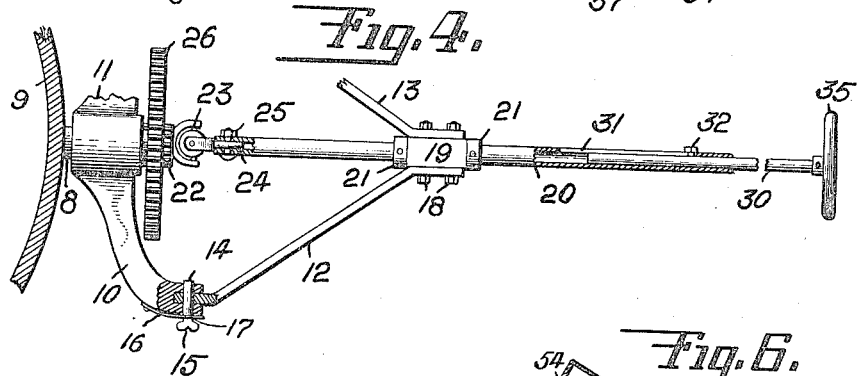
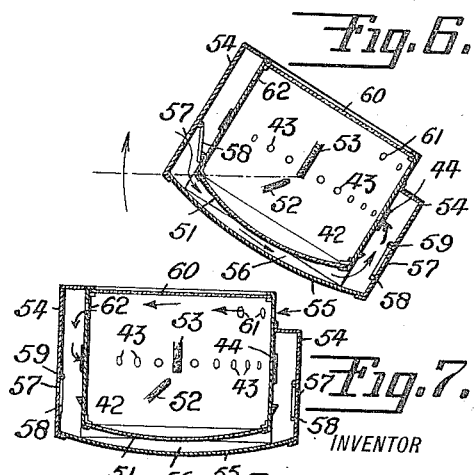
INVENTOR
ELMER A. SPERRY.
BY
Herbert H. Thompson
ATTORNEY Patented June 26, 1923.

1,459,902

UNITED STATES PATENT OFFICE.

ELMER A. SPERRY, OF BROOKLYN, NEW YORK.

SEARCHLIGHT FOR THE GUIDANCE OR DETECTION OF AIRCRAFT.

Application filed April 19, 1918. Serial No. 229,485.

*To all whom it may concern:*

Be it known that I, ELMER A. SPERRY, a citizen of the United States of America, residing at 1505 Albemarle Road, Brooklyn, in the county of Kings and State of New York, have invented certain new and useful Improvements in Searchlights for the Guidance or Detection of Aircraft, of which the following is a specification.
This invention relates to searchlights, more specifically to means for directing the beam of a searchlight from a distant point.

The high intensity searchlight constitutes one of the essential elements in the system of defense against enemy aircraft. In view of the high speed of flight of the latter and the ease and rapidity with which these aircraft can change course it is important that the searchlight respond quickly to its control and preferably that the operator may act also as observer. To render this possible the light should be controllable from a distance by a control to which the light will readily respond.
The searchlight has also come into use as a nocturnal beacon for guiding airplanes in times of peace, and for illuminating aviation fields. In such lights also, it is highly desirable to be able to direct the beam more or less vertically and to vary the direction of the beam at will, since it is found that a moving beam is much more easily picked up by the aviator than a stationary beam. When the airplane approaches the field, the light may also be employed to illuminate the field by directing the beam horizontally.

One of the principal objects of the present invention is to provide a simple control means fulfilling the above requirements.

A further object is to provide a searchlight and control means therefor which may readily be placed in a trench or trenches to minimize the danger of damage either to the light or operator, due to shell fire.

Another important object is to provide an invertible searchlight capable of being kept on a target passing directly above the light. Further objects and advantages will appear as the invention is hereinafter developed.

Referring to the drawings which illustrate what I now consider the preferred form of my invention:
Fig. 1 is a sectional elevation of a trench system showing a searchlight mounted therein.

Fig. 2 is a plan view thereof.

Fig. 3 is a plan view, partly in section, of a searchlight drum.

Fig. 4 is a fragmentary detail plan view of one form of control mechanism.

Fig. 5 is a section taken on the line 5—5 of Fig. 3, the scale in Fig. 5 being smaller than that in Fig. 3 and the size of certain of the parts being exaggerated for the sake of clearness.

Figs. 6 and 7 are views similar to Fig. 5 but on a still smaller scale and illustrate the drum in different positions with respect to the horizontal pivots.

My invention comprises a searchlight movable about at least two axes, one of which is preferably vertical and another horizontal. One form of support is shown in Fig. 1 as comprising a carriage 1 rotatably mounted on a base 2 about a vertical pivot 3. Rollers 4 may be mounted on the lower part of said carriage 1 in a position to engage the base 2 for the purpose of steadying the lamp. The carriage 1 comprises a plurality of upstanding arms 5, 6 journaled at their upper ends to receive the substantially horizontal pivots 7, 8 (see Fig. 3) of the searchlight 9. The base 2 should preferably be of such area as to prevent excessive sinking of the searchlight when mounted on soft ground. It will be seen that by moving the searchlight about either or both of its axes the beam of the light may be directed anywhere in space.

While the control mechanism may be located adjacent the light, I prefer to locate it to one side for various reasons, among which are the following: When the light is employed for military purposes it is desirable to place the operating station at a substantial distance from the lamp to reduce casualties. Furthermore it is found that the accuracy in directing the beam is enhanced as the angle between the lines connecting the target and observer and the target and searchlight is increased. A preferred form of distant control is shown in Figs. 1, 2 and 4 and may be constructed substantially as follows:

Secured to the upright 6, either integrally as indicated in Fig. 4 or preferably detachably as indicated in Fig. 2, are a plurality of arms 10, 11. The last mentioned arms are preferably bifurcated at their outer extremities to form seats for the straps 12, 13 which are pivotally connected, for a purpose which will hereinafter appear, to said arms. Preferably the connection between the straps and arms should be made detachable as indicated in Fig. 4, each pivot pin 14 being provided with a reduced portion or peripheral groove 17 into which a spring 16 is adapted to enter to hold the pin in operative position. Obviously the pins 14 may be readily withdrawn by raising the spring 16 and exerting a pull on the head 15. Detachably connected, by means of bolts 18, to the outer ends of straps 12, 13 is a block 19 through which an operating member or rod 20 extends. By revolving the rod 20 about the vertical axis of the searchlight, the latter may be caused to assume any position in azimuth.

The rod 20, which is illustrated in the form of a sleeve, may also be employed for controlling the position of the searchlight in elevation. While this function may be accomplished by connecting the member 20 directly to one of the horizontal pivots 7 or 8 of the light, I prefer to effect this connection through reduction gearing. The member 20 is rotatable in the block 19, a collar 21 being mounted on said member on each side of block 19 to prevent end movement of said member. The inner end of the operating member is connected to the shaft of pinion 22, journaled in the upright 6 by means of a universal joint 23. This universal joint, which is directly in line with the line of pivots 14, is preferably detachably connected to the sleeve 20 by means of a shank 24 adapted to enter said sleeve and to be secured thereto by means of a through bolt 25. The pinion 22 meshes with a gear 26 secured to pivot 8 of the searchlight so that by rotating the operating member 20 the light may be rotated about its horizontal pivots and the elevation of the beam controlled.

My invention as above described is especially adapted to be applied to military use, particularly in anti-aircraft work. Thus the light may be mounted in a trench T surrounded by a substantially circular trench or runway T' spaced a substantial distance from the central trench. Preferably the operating member should be made adjustable in length. This may be accomplished by providing a rod 30 adapted to telescope into the sleeve 20 but connected thereto in such a manner as to turn therewith. One form of suitable connection is shown in Fig. 4 as comprising a longitudinal slot 31 in sleeve 20 adapted to receive a set screw 32 screwed into rod 30. Obviously the rod 30 may be pushed into or pulled out of the sleeve 20 but on rotation of the first mentioned member the sleeve 20 will rotate therewith. To facilitate the control of the searchlight the rod 30 may have rotatably mounted thereon a wheel 34, which may assume the form of an ordinary bicycle wheel, adapted to travel on the track or runway 33 to support the weight of the operating member. A manually operable member in the form of a hand-wheel 35 is rigidly but preferably detachably secured to the free end of rod 30.

It will be seen that the searchlight 9 and all of its control is wholly below the surface of the ground so that the chance of damage thereto by gunfire is minimized. If desirable a barrier of sand bags 36 may be provided around the trench T' for additional protection. To control the direction of the beam in azimuth the operator in the trench T' simply moves around this trench in one direction or the other, moving the member 35 with him. To control the elevation of the beam the operator rotates the wheel 35 in one direction or the other.

As the operator is stationed a substantial distance to one side of the searchlight in the direction in which the horizontal axis thereof extends it will be seen that not only is he protected against injury by shell-fire drawn by the light but the angle between his line of sight and that of the beam is large, resulting in great accuracy in directing the beam.

It has heretofore been the practice to mount a searchlight for rotation about a horizontal axis, but so far as I am aware the electrode or carbon holders and the control box were mounted at the bottom of the drum at a position substantially midway between the pivots. This arrangement restricts the angle through which the light may be swung about the horizontal axis, for if the light is moved to a position where the holder and control box are above the arc, damage to said elements results, due to the intense heat arising from the arc. In order to render it possible to move the searchlight to any position about the horizontal axis, I connect the control box 40 and the electrode holders, one of which is shown at 41, to the drum 42 of the searchlight 9, in a position closer to one of the pivots 7 than to the other. Obviously with this arrangement the said elements 40, 41 will never be in the path of the heat rising from the arc regardless of what position the light assumes.

Means are also provided for withdrawing air from the drum to dissipate the heat and fumes generated by the arc. As either side of the drum 42 may be the top side in the preferred manner of operating, I provide ventilating openings on both sides of the line of pivots 7, 8 as indicated in Fig. 3. A plurality of openings 43 are shown in said drum communicating with a passageway 44 formed by securing a curved plate 45 to the drum. In order to withdraw air from the passageway 44 and consequently from the interior of the drum 42, I provide a suction fan or other suitable exhaust device 46. While this fan and its hood 47 may be mounted in various positions, I prefer to mount it in a position similar to that of the box 40 but on the other side of pivots 7, 8. With this arrangement the balance and symmetry of the searchlight is preserved.

I prefer to introduce air into the drum 42 through the electrode holders as disclosed in my U. S. Letters Patent No. 1,282,133, dated October 22, 1918, electrode holder for searchlights. By introducing air in this manner a jet, or jets, is formed from the vicinity of the arc to the openings 43 to carry off both the fumes and the heat generated by the arc.

In addition to the cooling and ventilating system above described, I provide also means for cooling the searchlight mirror, or other condenser, and the front door of the drum. As these elements are usually constructed of glass the importance of properly cooling them is obvious. Referring to Figs. 5, 6 and 7 it will be seen that I have shown a glass mirror 51 adjacent the rear of the drum for reflecting rays emanating from the arc between the carbons 52, 53. When the drum is in the position illustrated in Fig. 7 practically all of the heat emanating from the arc passes either outwardly or upwardly so that there is little danger of the mirror becoming dangerously heated in this position. If the drum is rotated about pivots 7, 8, to either side of the vertical, to a position in which a portion or all of the mirror is above the horizontal plane through the arc, the upper portion will be subjected to rather intense heat while any portion below said plane will be comparatively cool. This would tend to crack the mirror. To prevent this and to maintain all points of the mirror at a practically uniform temperature, I provide means for introducing a cooling draught of air adjacent any portion of said mirror which happens to be above the horizontal plane through the arc and for passing this draught down over the mirror. This means may assume the form illustrated in Figs. 3, 5, 6 and 7 and constructed substantially as follows:

A casing 54 is provided on each side of the drum 42, preferably midway between pivots 7, 8. Air may be exhausted from these casings by any suitable means. Thus the fan 46 may be employed for this purpose by connecting the passageway 44 to said casings. A convex plate 55 preferably of greater curvature than the mirror 51 is secured to the rear of the drum 42 thus forming the back thereof and providing a passage 56 behind the mirror. This passage 56 communicates with the interior of casings 54 as shown in Figs. 5, 6, and 7. Openings 57 are provided in each casing 54 and are closed, when the drum is in vertical position as indicated in Fig. 7, by doors or vanes 58 pivoted or hinged at 59 to one of the inner walls of casings 54. The vanes 58 are so designed that one or the other will close, completely, the passage through a corresponding one of casings 54 when the lamp is swung a predetermined amount to one side or the other of this vertical position. Thus in Fig. 6 a portion of the mirror 51 is about to pass above the horizontal plane of the arc, indicated by the dot and dash line. The upper vane 58 has dropped away from its opening 57 and into a position in which it completely shuts off communication between the upper portion of passage 56 and the fan 46. The lower vane 58 is in a position closing its aperture 57 so that a draught of cold air will be drawn through upper aperture 57 down over the back of mirror 51, through lower casing 54 and passage 44 to the suction fan 46 and out. This draught will continue so long as a portion of the mirror 51 is above the horizontal plane of the arc. Obviously the action will be similar for a tilt of the light in the opposite direction from the vertical position, and it will be noticed that when any portion of the mirror is above the arc the air enters adjacent that portion and is drawn downwardly over the mirror.

In order to cool the glass front door 60 of the drum an opening may be provided at 62 and a plurality of oppositely located openings provided in the drum 42 at 61. As air is exhausted from the casing 54, air will enter at 61, sweep across the glass front 60 and be withdrawn from the drum at 62.

It will be seen that I have provided a searchlight which may be readily inverted in action and is therefore, easily kept on the target. Furthermore the distant control is simple, reliable and may be readily assembled or disassembled by virtue of the detachable connections.

In order to conduct electric current to the light, a current conducting cable 48 may be led underground from a distant generating plant (not shown) to the light. Considerable slack should be provided in said cable between the point where it emerges from the ground and the light in order that the latter may be rotated several times in azimuth in the same direction without strain on said cable. If desirable a strain detachable connector 49 may be provided in said slack portion to prevent breakage of said cable. Communicating passages P may be provided between the trenches T and T' so that the operator may gain access to the light without exposing himself to enemy fire. Planks or board 50 may be placed over said passageways to preserve the continuity of the trackway of the wheel 34. Any unevenness in this trackway will not interfere with the operation of the mechanism because by virtue of the pivots 14 and universal connection 23 the wheel 34 will readily follow the profile of the trackway.

In accordance with the provision of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent, is:

1. In combination, a support, a searchlight drum horizontally pivoted on said support, and an electrode holder within said drum and connected thereto at a position closer to one of said pivots than to the other.

2. In combination, a substantially horizontally pivoted searchlight drum, a control box carried by said drum nearer to one pivot than to the other and a ventilating hood carried by said drum and symmetrically located with respect to said control box.

3. An invertible flaming arc, high-intensity searchlight comprising a substantially horizontally pivoted drum and means for withdrawing air from said drum on opposite sides of the pivots.

4. An invertible, flaming arc searchlight comprising a substantially horizontally pivoted drum and electrode supporting means within said drum, said last mentioned means being positioned to one side of a plane perpendicular to the pivots of said drum and passing through the center of said drum.

5. In a searchlight, the combination with a drum pivoted for turning about a horizontal axis, apertures in said drum for withdrawing air therefrom, said apertures extending circumferentially around the drum for a substantial distance, whereby a point of exhaust will be maintained substantially in line with the rising vapors of the arc irrespective of the angular position of the searchlight.

6. In a searchlight, the combination with a drum pivoted for turning about a horizontal axis, an electrode holder within said drum, a control box mounted on the drum at a less angle to said axis than 90°, a connection between the box and holder and means for withdrawing fumes from the drum at points other than above or in line with the holder and box.

7. In combination, a support, a searchlight drum horizontally pivoted on said support, and an electrode holder within said drum, a control mechanism, a support connecting said holder and said mechanism, said support being inclined at an angle to the pivotal axis of said drum, whereby said lamp may be burned with said mechanism above the arc.

8. In combination, an electric arc searchlight pivoted for movement about a substantially horizontal axis, a light condenser in said searchlight and means controlled by the position of the searchlight for passing a cooling draught of air over said condenser when any portion thereof is above the horizontal plane of the arc.

9. In combination, an invertible electric arc searchlight pivoted for movement about a substantially horizontal axis, a light condenser in said searchlight and means for passing a draught of air downwardly over said mirror when any portion thereof is above the horizontal plane of the arc.

10. In combination, a searchlight drum having a ventilating passage, means for supporting said drum for rotation about a substantially horizontal axis, means for causing air to pass through said passage and means responsive to the position of the drum with reference to said axis for controlling the direction of air flow through said passage.

11. In combination, an invertible searchlight drum pivoted for movement about a substantially horizontal axis, means for withdrawing air from said drum at points on opposite sides of said axis, a condenser in said drum and means for passing a draught of air downwardly over said condenser when said drum is in either of its horizontal positions.

12. In combination, an invertible searchlight drum pivoted for movement about a substantially horizontal axis, a mirror mounted in said drum, and means for passing a down draught of air over said mirror when said drum is rotated a predetermined amount to either side of vertical position.

13. In combination, an invertible searchlight drum pivoted for movement about a substantially horizontal axis, a mirror mounted in said drum, and means for passing a down draught of air over said mirror when said drum is rotated a predetermined amount to either side of vertical position, a transparent front door for said drum and means for passing a cooling draught across the inner face of said door.

14. A flaming arc searchlight including a drum pivoted for wide angle movement about a substantially horizontal axis and means for ventilating the drum in a plurality of angular positions of more than 90 degrees arc of movement, said means being adapted to cause the cooling fluid to assume a separate course for each of said positions.

15. In combination, an invertible flaming arc high-intensity searchlight comprising a substantially horizontally pivoted drum, means for withdrawing air from said drum on opposite sides of the horizontal pivots and means for swinging said drum about its horizontal axis through a position in which the beam is vertical.

16. In a searchlight, a drum mounted for movement about an axis, a reflector in said drum, lamp mechanism associated with said drum, means for causing a cooling fluid to pass through said drum, and additional means for cooling said reflector comprising an auxiliary chamber exterior to said drum having oppositely disposed vents, and means controlled by the position of the drum for closing the lowermost of said vents.

In testimony whereof I have affixed my signature.

ELMER A. SPERRY.